(12) United States Patent
Hoshino (10) Patent No.: US 12,216,987 B2
(45) Date of Patent: Feb. 4, 2025

(54) GENERATING HEADING BASED ON EXTRACTED FEATURE WORDS

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/037,889

(22) PCT Filed: Nov. 25, 2020

(86) PCT No.: PCT/JP2020/043812
§ 371 (c)(1),
(2) Date: May 19, 2023

(87) PCT Pub. No.: WO2022/113202
PCT Pub. Date: Jun. 2, 2022

(65) Prior Publication Data
US 2023/0409808 A1    Dec. 21, 2023

(51) Int. Cl.
G06N 20/00    (2019.01)
G06F 40/103   (2020.01)
G06F 40/126   (2020.01)
G06F 40/166   (2020.01)
G06V 30/19    (2022.01)
G06V 30/416   (2022.01)

(52) U.S. Cl.
CPC ......... *G06F 40/166* (2020.01); *G06F 40/103* (2020.01); *G06F 40/126* (2020.01); *G06N 20/00* (2019.01); *G06V 30/19127* (2022.01); *G06V 30/416* (2022.01)

(58) Field of Classification Search
None
See application file for complete search history.

(56) References Cited

U.S. PATENT DOCUMENTS

| 11,227,183 | B1* | 1/2022 | Connors | G06F 18/2113 |
| 11,849,196 | B2* | 12/2023 | Parmar | G10L 15/26 |
| 2008/0201130 | A1 | 8/2008 | Peters et al. | |
| 2014/0122479 | A1* | 5/2014 | Panferov | G06F 3/0643 |
| | | | | 707/736 |

FOREIGN PATENT DOCUMENTS

EP    0807889 A2    11/1997
JP    H09-305603 A    11/1997
(Continued)

OTHER PUBLICATIONS

J. Ding, Y. Li, H. Ni and Z. Yang, "Generative Text Summary Based on Enhanced Semantic Attention and Gain-Benefit Gate," in IEEE Access, vol. 8, pp. 92659-92668, 2020. (Year: 2020).*

(Continued)

*Primary Examiner* — Amelia L Tapp (57) ABSTRACT

The information processing device generates headings from structured documents. The acquisition means acquires a structured document including headings and texts. The feature word extraction means extracts feature words from subordinate elements of the heading for the headings included in the structured document. The heading generation means generates a new heading corresponding to the subordinate elements based on the extracted feature words.

12 Claims, 9 Drawing Sheets

(56) References Cited

FOREIGN PATENT DOCUMENTS

| | | |
|---|---|---|
| JP | H11-259476 A | 9/1999 |
| JP | 2002-278949 A | 9/2002 |
| JP | 2007-514998 A | 6/2007 |
| JP | 2009-294950 A | 12/2009 |
| JP | 2012-128509 A | 7/2012 |
| JP | 2013-050853 A | 3/2013 |
| KR | 10-1600870 B1 | 3/2016 |
| WO | WO-2017124116 A1 * | 7/2017 |

OTHER PUBLICATIONS

Min et al., "Decomposing Background Topics from Keywords by Principal Component Pursuit" CKIM, Copyright 2010 ACM, pp. 269-277. (Year: 2010).*
International Search Report for PCT Application No. PCT/JP2020/043812, mailed on Feb. 16, 2021.

* cited by examiner

24y:FEATURE WORD EXTRACTION UNIT

FIG. 8B

THE MATRIX OF THE DOCUMENT X OCCURRING WORDS

|  | WORD1 | WORD2 | WORD3 | · | · |
|---|---|---|---|---|---|
| DOCUMENT A | 5 | 0 | 2 | · | · |
| DOCUMENT B | 1 | 3 | 1 | · | · |

FIG. 9

24z:FEATURE WORD EXTRACTION UNIT

GENERATING HEADING BASED ON EXTRACTED FEATURE WORDS

This application is a National Stage Entry of PCT/JP2020/043812 filed on Nov. 25, 2020, the contents of all of which are incorporated herein by reference, in their entirety.

TECHNICAL FIELD

The present invention relates to a technique for applying headings to structured documents.

BACKGROUND ART

In websites, there are systems such as a search engine which outputs search results against inputs of keywords by a user, and a so-called chatbot (Chatbot) which answers to a user's query statement (query). Such systems refer to structured documents on the Web associated with the inputted keywords and the query to generate the search results and/or answers. Patent Document 1 discloses a technique for structuring documents by their use. Also, Patent Document 2 discloses a technique for judging an implication relationship between a heading and text included in a structured document using machine learning.

PRECEDING TECHNICAL REFERENCES

Patent Document

Patent Document 1: Japanese Patent Application Laid-Open under No. JP 2009-294950
Patent Document 2: Japanese Patent Application Laid-Open under No. JP 2013-50853

SUMMARY

Problem to be Solved by the Invention

In order to generate appropriate search results and answers to user inputs, it is necessary that appropriate headings are given to the structured documents. However, if a heading is added by referring to tag information from a structured document such as HTML, for example, the heading may be simply a number or symbol indicating an order, or may be identical to other headings, and the information of the heading becomes insufficient.

It is an object of the present invention to provide an information processing device capable of generating appropriate headings based on subordinate headings and texts in a structured document.

Means for Solving the Problem

According to an example aspect of the present invention, there is provided an information processing device comprising:
- an acquisition means configured to acquire a structured document including headings and texts;
- a feature word extraction means configured to extract feature words from subordinate elements of the heading for the headings included in the structured document; and
- a heading generation means configured to generate a new heading corresponding to the subordinate elements based on the extracted feature words.

According to another example aspect of the present invention, there is provided an information processing method comprising:
- acquiring a structured document including headings and texts;
- extracting feature words from subordinate elements of the heading for the headings included in the structured document; and
- generating a new heading corresponding to the subordinate elements based on the extracted feature words.

According to still another example aspect of the present invention, there is provided a recording medium recording a program which causes a computer to execute processing of:
- acquiring a structured document including headings and texts;
- extracting feature words from subordinate elements of the heading for the headings included in the structured document; and
- generating a new heading corresponding to the subordinate elements based on the extracted feature words.

Effect of the Invention

According to the present invention, it is possible to generate appropriate headings based on subordinate headings and texts in structured documents.

EXAMPLE EMBODIMENTS

Preferred example embodiments of the present invention will be described with reference to the accompanying drawings.

First Example Embodiment

[Overall Configuration]

Figure 1:
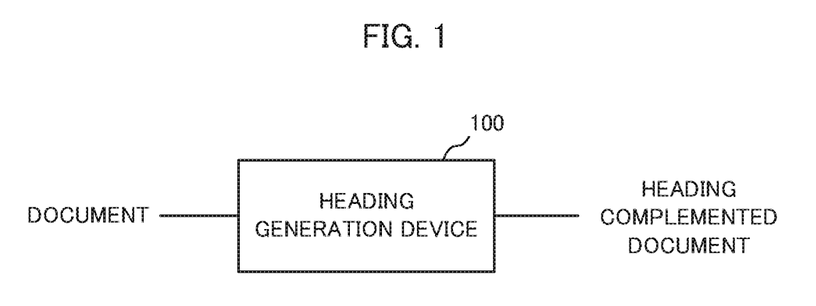
FIG. 1 shows an overall configuration of a heading generation device according to a first example embodiment.

FIG. 1 shows an overall configuration of a heading generation device according to the first example embodiment. The heading generation device 100 outputs a heading complemented document in which appropriate headings are added to an inputted document. If the inputted document has already been structured, the heading generation device 100 determines whether or not the headings included in the structured document are appropriate and outputs a heading complemented document in which the headings determined to be inappropriate are corrected. On the other hand, if the inputted document is not structured, the heading generation device 100 first structures the inputted document, and then corrects the inappropriate headings to output the heading complemented document.

[Structured Document]

A structured documents is a document that marks up the structure of the document, and typically XML (eXtensible Markup Language) or HTML (Hyper Text Markup Language) are known as the structured document. In XML and HTML documents, the structure of the document is expressed by character strings called tags.

Figure 2:
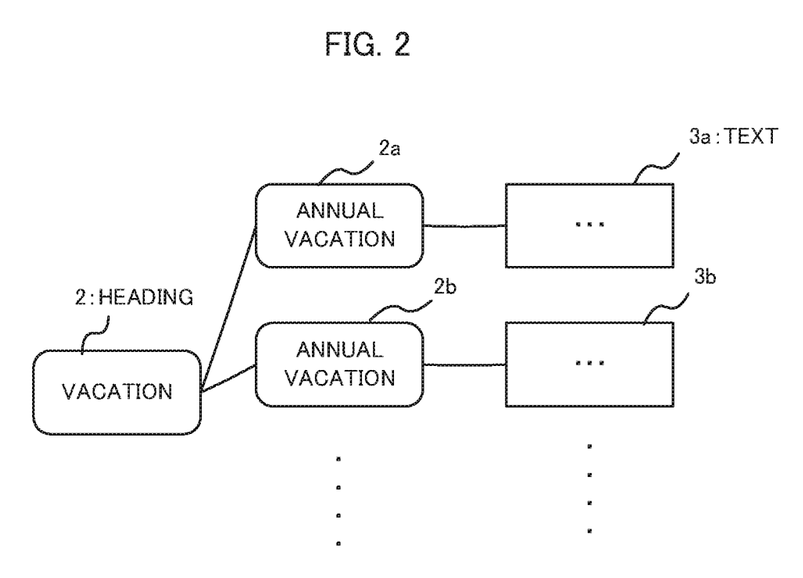
FIG. 2 is an example of a hierarchical structure of a structured document.

FIG. 2 shows an example of a hierarchical structure of a structured document. This document is an explanatory document of the term "Vacation" and includes headings 2, 2a, 2b, . . . and texts 3a, 3b . . . . The heading 2 is the heading at the highest level (the first level), and the headings 2a and 2b are the headings at the lower level (the second level). Each text 3a, 3b is a text corresponding to the heading 2a, 2b. In this structured document, both the headings 2a and 2b are "Annual Vacation" and have the same character strings. Therefore, when this structured document is used for search or browsing, there is a possibility that correct search results or answers cannot be outputted to the user's input regarding "Annual Vacation". Thus, in the structured document, if the character string of the heading is identical to the character string of another heading in parallel relationship, those headings are inappropriate because they cannot be distinguished from each other. Also, even if the character strings of the headings are not identical, if the character strings of the headings are similar or if the character string of one heading implies the meaning of the character string of the other heading, the headings are considered to be inappropriate.

In addition, the heading is inappropriate if the character string of the heading in a parallel relationship in the structured document does not have sufficient meaning. The headings are considered to be inappropriate when each heading does not have a specific meaning, for example, when the character strings of the headings are merely numbers or symbols such as "1.", "2.", "(a) and "(b)", or when the character strings of the headings merely indicate the order of sections such as "Chapter 1" and "Chapter 2".

When the headings of the structured document are inappropriate, the output for the user's search and browsing may be inappropriate. Therefore, the heading generation device 100 detects inappropriate headings in the structured document and corrects them to be appropriate.

[Outline of the Method for Generating Headings]

Figure 3:
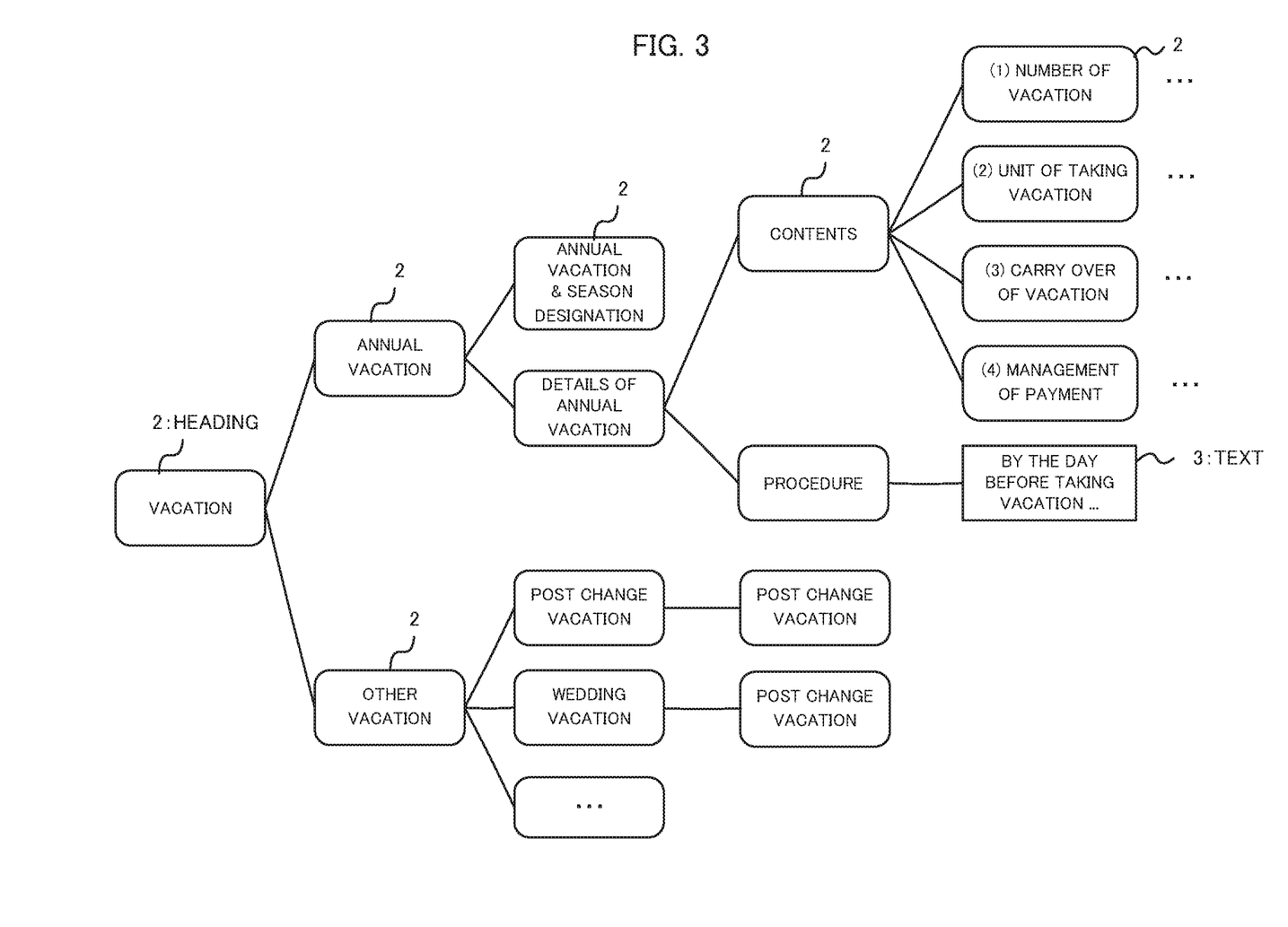
FIG. 3 is another example of a structured document.

FIG. 3 shows another example of a structured document. This example is also a structured document regarding the term "Vacation" and includes a hierarchical structure of multiple headings 2 and texts 3. In FIG. 3, for convenience, some headings and texts are not shown.

If the heading included in the structured document is inappropriate, heading generation device 100 generates a new heading instead of the inappropriate heading. Specifically, the heading generation device 100 generates a new heading to replace the inappropriate heading based on the subordinate elements of the inappropriate heading. Here, "the subordinate elements" includes at least one of headings (the subordinate headings) 2 and the texts 3 existing in the lower hierarchy of the inappropriate heading.

Figure 4:
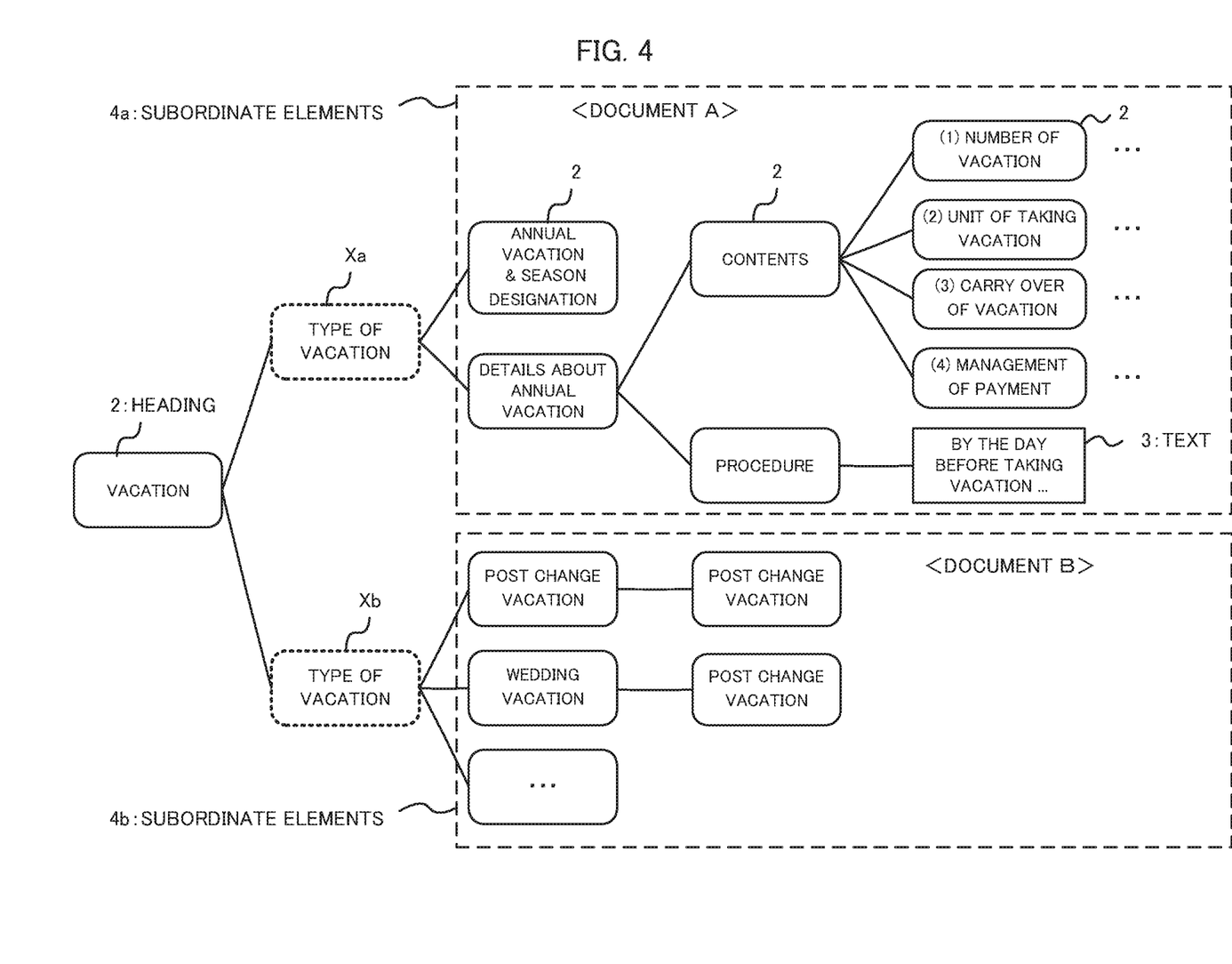
FIG. 4 shows an example where the heading is inappropriate in the structured document shown in FIG. 3.

FIG. 4 shows the case where two headings Xa and Xb in parallel relationship are inappropriate in the structured document shown in FIG. 3. In this example, both the headings Xa and Xb are "Type of vacation" and are inappropriate because both the headings Xa and Xb have the same character strings. In this case, the heading generation device 100 generates new headings instead of the two inappropriate headings Xa and Xb. Specifically, the heading generation device 100 generates a new heading to replace the inappropriate heading Xa based on the subordinate elements 4a (i.e., document A) of the inappropriate heading Xa. Also, the heading generation device 100 generates a new heading to replace the inappropriate heading Xb based on the subordinate elements 4b (i.e., document B) of the inappropriate heading Xb.

Specifically, the heading generation device 100 generates the new headings that replace the inappropriate headings Xa and Xb in a manner that differs from one another using the subordinate elements 4a and 4b of the inappropriate headings Xa and Xb. In other words, the heading generation device 100 generates the new headings so that the new headings that replace the inappropriate headings Xa and Xb do not fall under the inappropriate headings.

[Hardware Configuration]

Figure 5:
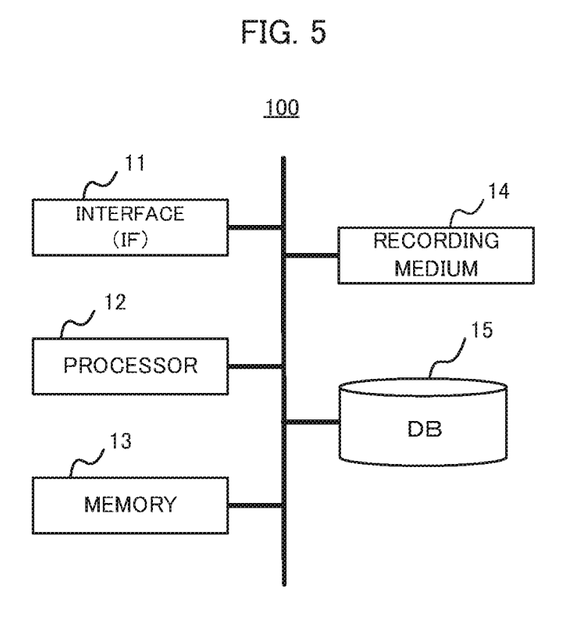
FIG. 5 is a block diagram showing a hardware configuration of the heading generation device.

FIG. 5 is a block diagram showing a hardware configuration of the heading generation device 100. As shown, the heading generation device 100 includes an interface (IF) 11, a processor 12, a memory 13, a recording medium 14, and a data base (DB) 15.

The IF 11 inputs and outputs data to and from external devices. Specifically, the documents subject to the heading generation processing are inputted through the IF 11. In addition, the heading complemented document whose inappropriate headings are corrected by the heading generation device 100 is outputted to an external device through the IF 11.

The processor 12 is a computer such as a CPU (Central Processing Unit) or a GPU (Graphics Processing Unit) and controls the entire heading generation device 100 by executing a program prepared in advance. Specifically, the processor 12 executes the heading generation processing to be described later.

The memory 13 may be a ROM (Read Only Memory) and a RAM (Random Access Memory). The memory 13 is also used as a working memory during the execution of various processing by the processor 12.

The recording medium 14 is a non-volatile and non-transitory recording medium such as a disk-type recording medium, a semiconductor memory, or the like, and is configured to be detachable from the heading generation device 100. The recording medium 14 records various programs executed by the processor 12. When the heading generation device 100 performs various processing, the program recorded in the recording medium 14 is loaded into the memory 13 and executed by the processor 12.

The database 15 temporarily stores the documents inputted through the IF 11. The heading generation device 100 may include a keyboard, an input unit such as a mouse, and a display unit such as a liquid crystal display for the user's instruction and input.

[Function Configuration]

Figure 6:
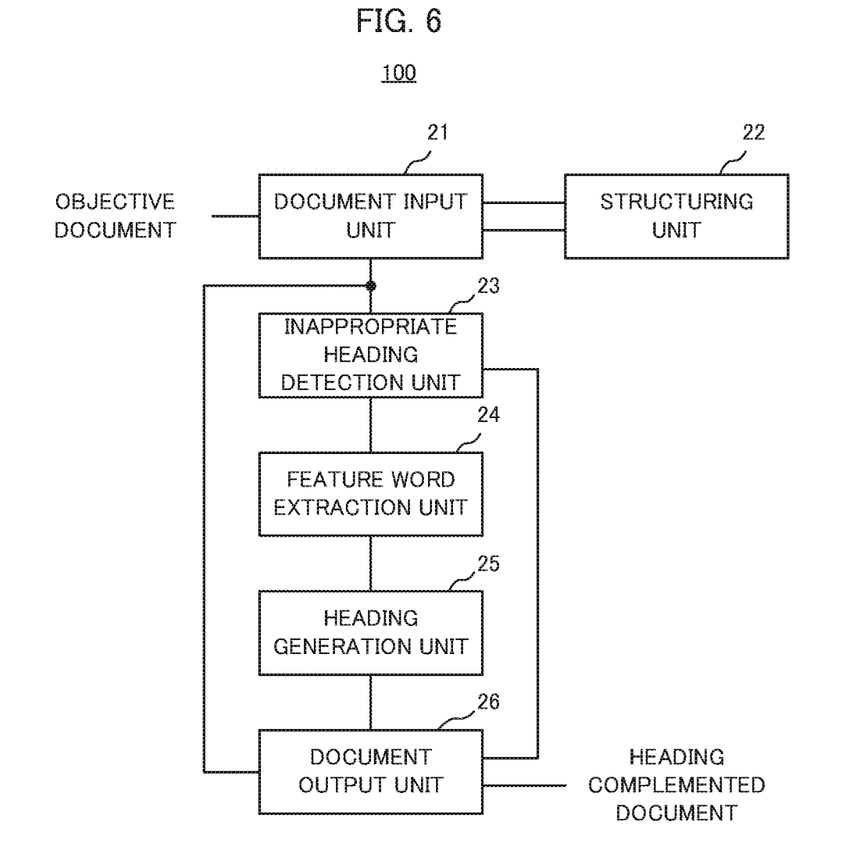
FIG. 6 is a block diagram showing a functional configuration of the heading generation device.

FIG. 6 is a block diagram illustrating a functional configuration of the heading generation device. The heading generation device 100 includes a document input unit 21, a structuring unit 22, an inappropriate heading detection unit 23, a feature word extraction unit 24, a heading generation unit 25, and a document output unit 26.

To the document input unit 21, a document that is subjected to the heading generation (hereinafter, also referred to as "objective document") is inputted. When the objective document inputted to the document input unit 21 is a structured document, i.e., a document that has already been structured, the document input unit 21 outputs the document to the inappropriate heading detection unit 23. On the other hand, when the objective document is a non-structured document (unstructured document), the document input unit 21 outputs the inputted document to the structuring unit 22 and receives the structured objective document from the structuring unit 22. Then, the document input unit 21 outputs the structured objective document to the inappropriate heading detection unit 23 and the document output unit 26.

The structuring unit 22 structures the inputted unstructured document, and outputs the structured document to the document input unit 21 as the structured document. For example, the structuring unit 22 performs processing of extracting the character string corresponding to the heading in the inputted unstructured document and putting a tag to the character string. Thus, the structuring unit 22 generates the structured document and outputs it to the document input unit 21.

The inappropriate heading detection unit 23 identifies a point in the inputted objective document where the generation of the heading is required. Specifically, the inappropriate heading detection unit 23 extracts the heading corresponding to the aforementioned inappropriate heading from the headings included in the objective document. Then, the inappropriate heading detection unit 23 outputs the subordinate elements of the inappropriate heading to the feature word extraction unit 24. In the example of FIG. 4, the inappropriate heading detection unit 23 detects the inappropriate headings Xa and Xb, and outputs the respective subordinate elements 4a and 4b, i.e., documents A and B, to the feature word extraction unit 24. Also, the inappropriate heading detecting unit 23 outputs information indicating the position of the inappropriate heading in the objective document to the document output unit 26. In the example of FIG. 4, the inappropriate heading detection unit 23 outputs information indicating the positions of the inappropriate headings Xa and Xb in the objective document to the document output unit 26.

The feature word extraction unit 24 extracts feature words from the subordinate elements of the inappropriate heading. "Feature word" is a word that characterizes the content of the document corresponding to the subordinate elements. In the example of FIG. 4, the feature word extraction unit 24 extracts the feature words from the document A corresponding to the subordinate elements 4a and extracts the feature words from the document B corresponding to the subordinate elements 4b. The feature word extraction unit 24 outputs, for each document, a plurality of feature words together with the feature scores of the feature words. The feature score indicates the degree to which the feature word is characteristic, and a higher feature score indicates that the feature word is more characteristic in the document. For example, the feature word extraction unit 24 outputs the feature word lists ranked by the feature scores to the heading generation unit 25 for each document A and B.

The heading generation unit 25 generates new headings corresponding to inappropriate headings using the feature words inputted from the feature word extraction unit 24. At this time, the heading generation unit 25 generates new headings so that the new headings have a difference from each other. In the example of FIG. 4, the heading generation unit 25 generates new headings corresponding to the inappropriate headings Xa and Xb so that each of the new headings is differentiated from each other. Then, the heading generation unit 25 outputs the generated new headings to the document output unit 26.

The document output unit 26 acquires information indicating the position of the inappropriate heading from the inappropriate heading detection unit 23 and acquires the new heading generated by the heading generation unit 25. Then, the document output unit 26 corrects the inappropriate heading in the objective document using the new heading and outputs the objective document as the heading complemented document.

Specifically, in the example of FIG. 4, it is supposed that the new heading "Annual Vacation" is generated for the inappropriate heading Xa and the new heading "Other Vacation" is generated for the inappropriate heading Xb. In this case, as a first method of correcting the inappropriate heading, the document output unit 26 replaces the inappropriate heading with the new heading. That is, the document output unit 26 replaces the inappropriate heading Xa "Type of vacation" with the new heading "Annual Vacation" and replaces the inappropriate heading Xb "Type of vacation" with the new heading "Other Vacation".

As a second method of correcting the inappropriate heading, the document output unit 26 adds the new heading to the inappropriate heading. In this case, the document output unit 26 modifies the inappropriate heading Xa "Type of vacation" to the new heading "Type of vacation (Annual Vacation)" and modifies the inappropriate heading Xb "type of vacation" to the new heading "Type of vacation (Other Vacation)".

In this way, the heading generation device 100 can correct inappropriate headings included in the objective document and output the objective document as a heading complemented document. Further, according to the heading generation device 100, even when the objective document is not structured, appropriate headings can be given after the objective document is structured by the structuring unit 22.

[Configuration Example of the Feature Word Extraction Unit]

Next, a configuration example of the feature word extraction unit 24 will be described.

First Example

Figure 7:
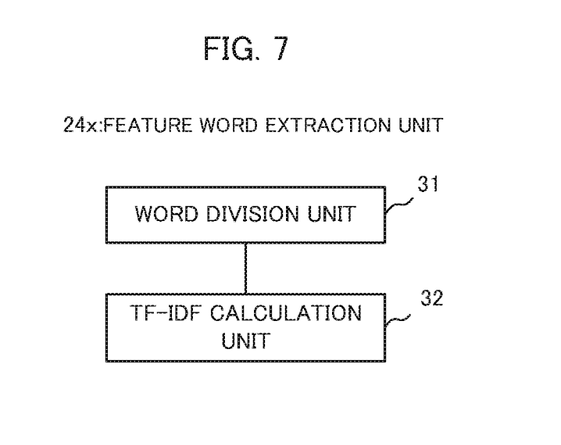
FIG. 7 shows a configuration of a feature word extraction unit according to a first example.

The feature word extraction unit 24x according to the first example extracts the feature words based on the appearance frequency of the words in the document corresponding to the subordinate elements. FIG. 7 shows a configuration of extracting feature words using the method of TF-IDF (Term Frequency-Inverse Document Frequency) as a typical method. The feature word extraction unit 24x includes a word division unit 31 and a TF-IDF calculation unit 32. The word division unit 31 performs morphological analysis of the document corresponding to the subordinate elements of the inappropriate heading and divides the document into word units.

The TF-IDF calculation unit 32 calculates a TF-IDF value for each word. The TF-IDF value is an index obtained by multiplying a TF value by an IDF value. The TF value is "the number of occurrences of a certain word in a document" and the IDF value is "the reciprocal number of the number of documents containing the certain word divided by the total number of the documents". The TF-IDF value is given by the following equation.

$$TF\text{-}IDF_{(w,d)} = TF_{w,d} \times \log(Nd/DF_{w,d})$$

In the above equation, "$TF_{w,d}$" is the number of occurrences of the word w in the document d, "$DF_{w,d}$" is the number of documents containing the word w, and "Nd" is the number of all documents. A high TF-IDF value indicates that a certain word appears many times in the document and that the word does not appear very much in other documents, and the higher TF-IDF value indicates that the word is more characteristic in the document. Therefore, the feature word extraction unit 24x calculates the TF-IDF value of each word included in the document corresponding to the subordinate elements, and extracts a predetermined number of words as the feature words in the descending order of the values from the one of the highest value. In this case, the TF-IDF value is used as the feature score for the feature word.

Second Example

Figure 8A:
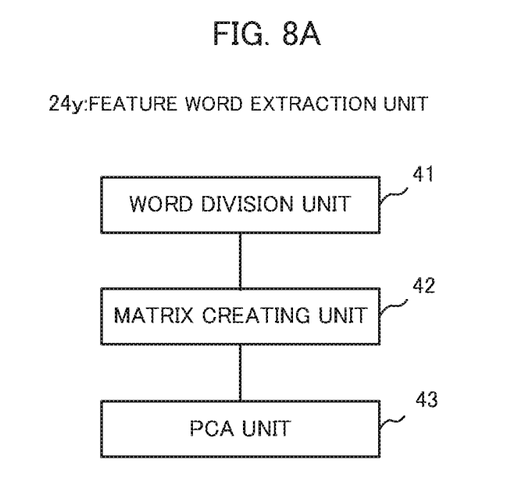
FIGS. 8A and 8B show a configuration of the feature word extraction unit, and a matrix according to a second example.

The feature word extraction unit 24y according to the second example extracts the feature word by reducing the dimension of the word appearing in the document using principal component analysis (hereinafter, referred to as "PCA"). FIG. 8A shows a configuration of the feature word extraction unit 24y using PCA. The feature word extraction unit 24y includes a word division unit 41, a matrix creating unit 42, and a PCA unit 43. The word division unit 41 performs morphological analysis of the document inputted as the subordinate element of the inputted inappropriate heading and divides the document into word units.

Figure 8B:
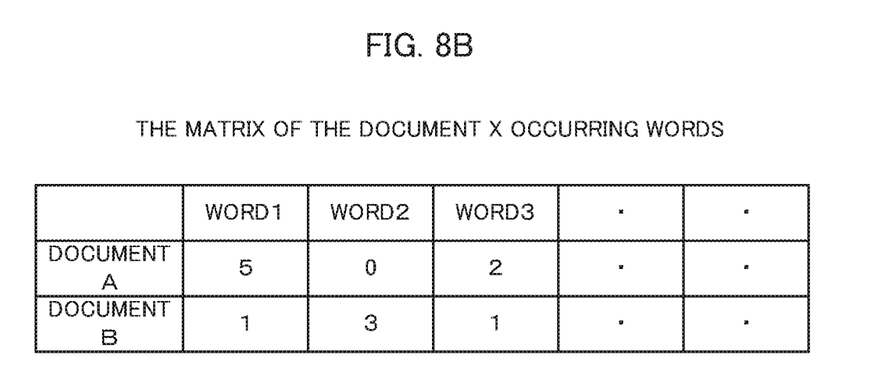

The matrix creating unit 42 creates the matrix of the document x appearing words. The matrix of the document x appearing words indicates, for each document, the appearance frequency of each word. FIG. 8B shows an example of the matrix. In this example, the matrix indicates the appearance frequency of each word in the documents A and B corresponding to the aforementioned subordinate elements 4a and 4b. The matrix creating unit 42 outputs the created matrix to the PCA unit 43.

The PCA unit 43 performs principal component analysis of the words appearing in each document based on the inputted matrix and extracts a predetermined number of principal components. For example, when reducing the matrix of the documents x appearing words to n dimensions, the PCA unit 43 extracts the first through n-th principal components of the words appearing in the document and outputs n words corresponding to those as the feature words. At this time, the contribution ratio of each principal component is used as the feature score of each feature word. In this way, the PCA unit 43 outputs a predetermined number of feature words in descending order of the feature scores from the one of the highest score for each document.

The Third Example

Figure 9:
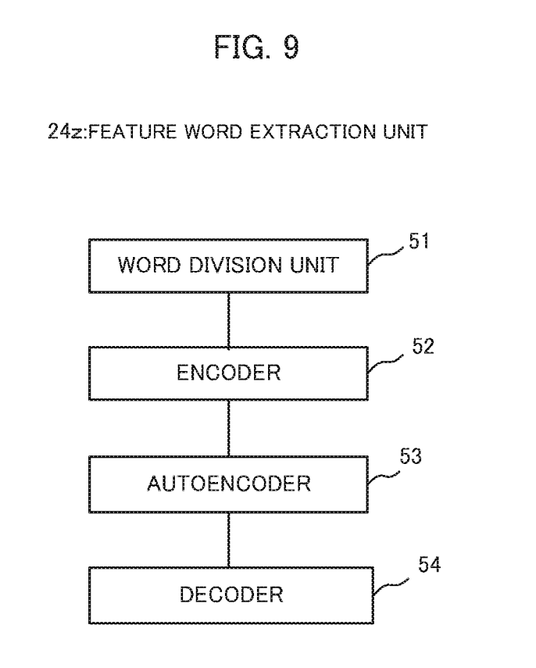
FIG. 9 shows a configuration of the feature word extraction unit according to a third example.

The feature word extraction unit 24z according to the third example extracts the feature word by reducing the dimension of the word appearing in the document using auto-encoding. FIG. 9 shows a configuration of the feature word extraction unit 24z using auto-encoding. The feature word extraction unit 24z includes a word division unit 51, an encoder 52, an autoencoder 53, and a decoder 54. The word division unit 51 performs morphological analysis of the document inputted as the subordinate element of the inputted inappropriate heading and divides the document into word units.

The encoder 52 expresses the words appearing in each document by vectors of a predetermined dimension using a method of a word distributed representation or a word embedding. The examples of the word distributed representation or the word embedding are Word2vec, Doc2vec, BERT (Bidirectional Encoder Representations from Transformers), and fastText. Instead of the method using the pre-trained model as described above, the documents may be vectorized using a simple model such as a Bag of Words.

For each document, the autoencoder 53 reduces the dimension of the vectorized word and generates the vector after the dimensionality reduction. The decoder 54 returns the vector after the dimensionality reduction to the word using method of the word distributed representation or the word embedding as described above. Thus, the feature word extraction unit 24z outputs a predetermined number of feature words together with the feature scores.

In the above-described configuration, the document input unit 21 is an example of an acquisition means, the structuring unit 22 is an example of a structuring means, the inappropriate heading detection unit 23 is an example of an inappropriate heading detection means, the feature word extraction unit 24 is an example of a feature word extraction means, the heading generation unit 25 is an example of a heading generation means, and the document output unit 26 is an example of a document correction means. The matrix creating unit 42 is an example of a matrix creating means, the PCA unit 43 is an example of an analyzing means.

[Heading Generation Processing]

Figure 10:
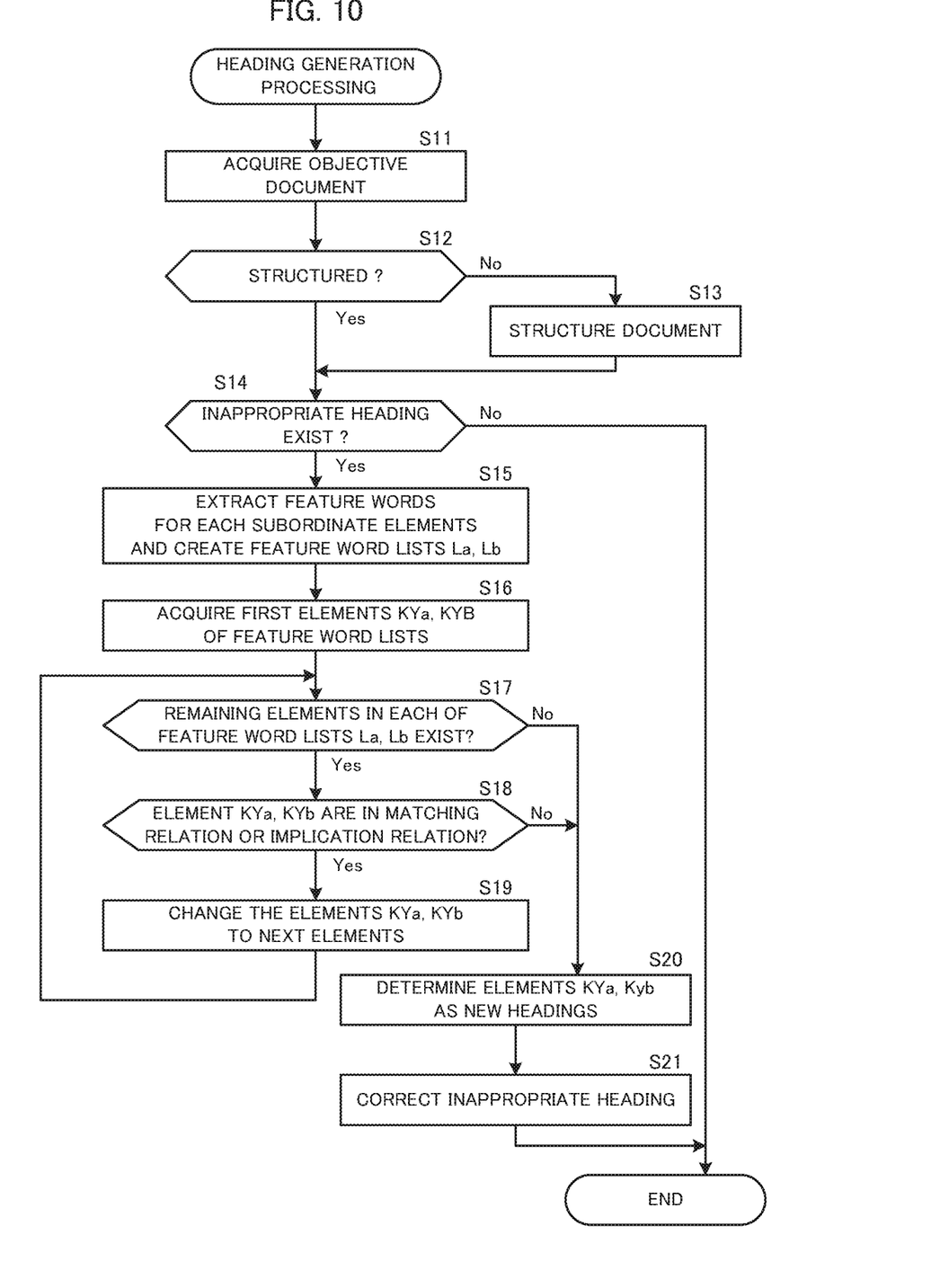
FIG. 10 is a flowchart of heading generation processing by the heading generation device.

FIG. 10 is a flowchart of heading generation processing executed by the heading generation device 100. This processing is realized by the processor 12 shown in FIG. 5, which executes a pre-prepared program and operates as each element shown in FIG. 6.

First, the document input unit 21 acquires an objective document (step S11) and determines whether or not the objective document is structured (step S12). When the inputted objective document is structured (step S12: Yes), the document input unit 21 outputs the objective document to the inappropriate heading detection unit 23. On the other hand, when the inputted objective document is not structured (step S12: No), the document input unit 21 outputs the objective document to the structuring unit 22, and the structuring unit 22 structures the objective document (step S13). Then, the structuring unit 22 outputs the structured objective document to the document input unit 21, and the document input unit 21 outputs the structured objective document to the inappropriate heading detection unit 23.

The inappropriate heading detection unit 23 determines whether or not one or more inappropriate headings are included in the inputted objective document (step S14). Specifically, the inappropriate heading detection unit 23 determines whether or not a plurality of headings in the parallel relationship are inappropriate in the objective document. When the objective document does not include any inappropriate heading (step S14: No), the processing ends.

On the other hand, when the objective document includes one or more inappropriate headings (step S14: Yes), the feature word extraction unit 24 extracts the feature words for each document corresponding to the subordinate elements of the inappropriate heading and creates a feature word list (step S15). The feature word extraction unit 24 extracts the feature words using any of the first through third method described above. The feature word list is a list in which, for each document, a plurality of extracted feature words are sorted in descending order of the feature scores. In the example of FIG. 4, the feature word extraction unit 24 creates the feature word lists La and Lb for the documents A and B corresponding to the subordinate elements 4a and 4b of the inappropriate headings Xa and Xb and outputs them to the heading generation unit 25.

The heading generation unit 25 generates new headings corresponding to the inappropriate headings using the feature word lists inputted from the feature word extraction unit 24. At this time, the heading generation unit 25 generates new headings so that the new headings are differentiated from each other. Specifically, the heading generation unit 25 acquires the first elements KYa and KYb of the feature word lists La and Lb (step S16) and determines whether or not there are any remaining elements in each of the feature word lists La and Lb (step S17). When there are no remaining elements in any of the feature word lists La and Lb (step S17: No), the processing proceeds to step S20.

On the other hand, when there are the remaining elements in any of the feature word lists La and Lb (step S17: Yes), the heading generation unit 25 determines whether or not the element KYa and the element KYb are in a matching relation or an implication relation (step S18). When the element KYa and the element KYb are not in the matching relation or the implication relation (step S18: No), the feature words corresponding to the element KYa and the element KYb are different, and they do not fall under the inappropriate headings. Therefore, the processing proceeds to step S20.

On the other hand, when the element KYa and the element KYb are in the matching relation or the implication relation (step S18: Yes), the heading generation unit 25 changes the elements KYa and KYb to the next elements in the feature word lists La and Lb (step S19). Here, the next element is the element that has the next higher feature score in the feature word list. At this time, the heading generation unit 25 may change only one of the elements KYa and KYb to the next element instead of changing both of the elements KYa and KYb to the next elements at the same time. Then, the processing returns to step S17, and the heading generation unit 25 performs the processing of steps S17 to S18 on the elements KYa and KYb after the change. Then, when there are no remaining elements in the feature word lists La and Lb (step S17: No), or when the element KYa and the element KYb are not in the matching relation or the implication relation (step S18: No), the processing proceeds to step S20.

In step S20, the heading generation unit 25 determines the elements KYa and KYb at that time as the new headings. Thus, the feature words that are not in the matching relation or the implication relation are determined as the new headings. Next, the document output unit 26 corrects the inappropriate headings in the objective document using the new headings and outputs the heading complemented document (step S21). As described above, as the method of correcting the inappropriate heading, the document output unit 26 may replace the inappropriate headings with the new headings and may add the new headings to the inappropriate headings. Then, the heading generation processing ends.

As described above, the heading generation unit 25 acquires the elements KYa and KYb in descending order of the feature scores from the feature word lists La and Lb and determines the elements KYa and KYb that do not fall under the inappropriate headings as the new headings. Thus, it is possible to obtain the new headings that sufficiently express the features of documents A and B and are not in the inappropriate relation such as the matching relation and the implication relation.

(Modification)

In the above flowchart, in step S17-S19, when the first element of the feature word list is in the matching relation or the implication relation, the heading generation unit 25 performs processing of changing to the next element. However, when the feature word extraction unit 24 uses PCA as in the second example and when the feature word extraction unit 24 uses autoencoder as in the third example, since the feature words extracted from different documents are basically differentiated from each other, step S17 to S19 may be omitted. In this case, the first elements KYa and KYb of the feature word lists obtained by step S16 may be adopted as the new headings.

Second Example Embodiment

Figure 11:
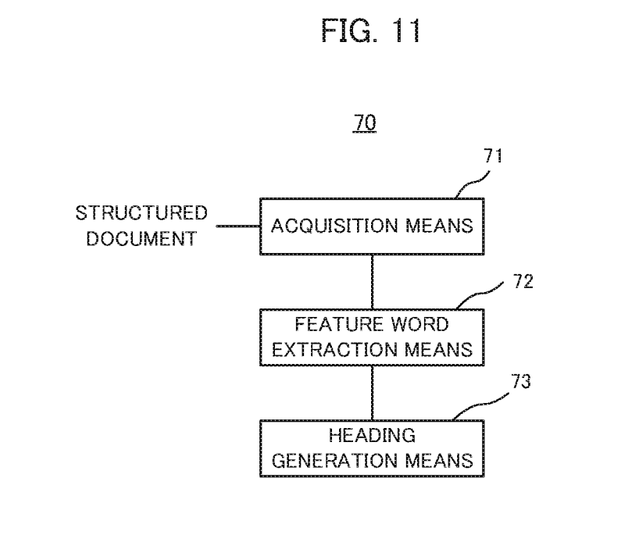
FIG. 11 is a block diagram showing a functional configuration of an information processing device according to a second example embodiment.

Next, a second example embodiment of the present invention will be described. FIG. 11 is a block diagram illustrating a functional configuration of an information processing device according to the second example embodiment. The information processing device 70 includes an acquisition means 71, a feature word extraction means 72, and a heading generation means 73. The acquisition means 71 acquires a structured document including headings and texts. The feature word extraction means 72 extracts feature words from subordinate elements of the heading for the headings included in the structured document. The heading generation means 73 generates a new heading corresponding to the subordinate elements based on the extracted feature words.

Figure 12:
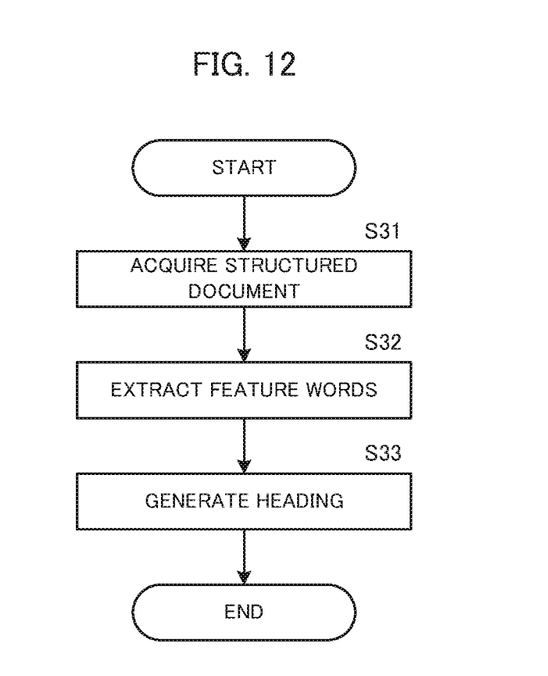
FIG. 12 is a flowchart of heading generation processing in the second example embodiment.

FIG. 12 is a flowchart of heading generation processing in the second example embodiment. The acquisition means 71 acquires a structured document including headings and texts (step S31). Next, the feature word extraction means 72 extracts feature words from subordinate elements of the heading for the headings included in the structured document (step S32). Then, the heading generation means 73 generates a new heading corresponding to the subordinate elements based on the extracted feature words (step S33).

According to the information processing device 70 of the second example embodiment, since the feature word is extracted from the subordinate elements of the heading included in the structured document and a new heading is generated, the information processing device 70 can generate appropriate headings for the objective document.

A part or all of the example embodiments described above may also be described as the following supplementary notes, but not limited thereto.

(Supplementary Note 1)

An information processing device comprising:
 an acquisition means configured to acquire a structured document including headings and texts;
 a feature word extraction means configured to extract feature words from subordinate elements of the heading for the headings included in the structured document; and
 a heading generation means configured to generate a new heading corresponding to the subordinate elements based on the extracted feature words.

(Supplementary Note 2)

The information processing device according to Supplementary note 1, wherein the subordinate elements include at least one of the subordinate headings below the heading and the texts below the heading in the structured document.

(Supplementary Note 3)

The information processing device according to Supplementary note 1 or 2, wherein the feature word extraction means extracts a feature word using a TF-IDF value.

(Supplementary Note 4)

The information processing device according to Supplementary note 1 or 2, the feature word extraction means comprising:
- a matrix creating means configured to generate a matrix of frequency of occurrence of words appearing in the document for each document included in the subordinate elements; and
- an analyzing means configured to extract the feature words by reducing dimension of the appearing words using principal component analysis.

(Supplementary Note 5)

The information processing device according to Supplementary note 1 or 2, wherein the feature word extraction means comprises:
- an encoder configured to convert the words appearing in the document into vectors, for each document included in the subordinate elements;
- an autoencoder configured to reduce the dimension of the vector using autoencoding; and
- a decoder configured to convert the vectors whose dimensions are reduced into words and output the feature words.

(Supplementary Note 6)

The information processing device according to any one of Supplementary note 1 to 5, further comprising an inappropriate heading detection means configured to detect an inappropriate heading from the headings included in the structured document,
- wherein the feature word extraction means extracts the feature words from the subordinate elements of the inappropriate heading, and
- wherein the heading generation means generates a new heading based on the extracted feature words.

(Supplementary Note 7)

The information processing device according to Supplementary note 6, further comprising a document correction means configured to generate a corrected document by replacing the inappropriate heading in the document with the new heading.

(Supplementary Note 8)

The information processing device according to Supplementary note 6, further comprising a document correction means configured to generate a corrected document by adding at least a part of the new heading to the inappropriate heading in the document.

(Supplementary Note 9)

The information processing device according to any one of Supplementary note 6 to 8, wherein the inappropriate heading is a heading of a character string identical to another heading in a parallel relationship in the document.

(Supplementary Note 10)

The information processing device according to any one of Supplementary note 6 to 9, wherein the inappropriate heading is in a parallel relationship in the document and includes a number or a symbol without meaning or content.

(Supplementary Note 11)

The information processing device according to any one of Supplementary note 1 to 9, further comprising a structuring means configured to convert an inputted document into the structured document.

(Supplementary Note 12)

An information processing method comprising:
- acquiring a structured document including headings and texts;
- extracting feature words from subordinate elements of the heading for the headings included in the structured document; and
- generating a new heading corresponding to the subordinate elements based on the extracted feature words.

(Supplementary Note 13)

A recording medium recording a program which causes a computer to execute processing of:
- acquiring a structured document including headings and texts;
- extracting feature words from subordinate elements of the heading for headings included in the structured document; and
- generating a new heading corresponding to the subordinate elements based on the extracted feature words.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

2 Heading
3 Text
12 Processor
21 Document input unit
22 Structuring unit
23 Inappropriate heading detection unit
24 Feature word extraction unit
25 Heading generation unit
26 Document output unit
31,41,51 Word division unit
32 TF-IDF Calculation unit
42 Matrix creating unit
43 PCA unit
52 Encoder
53 Autoencoder
54 Decoder

What is claimed is:

1. An information processing device comprising:
a memory storing instructions; and
one or more processors configured to execute the instructions to:
acquire a structured document including a heading and text;
generate, for the heading included in the structured document, a matrix of frequency of occurrence of words appearing in documents of subordinate elements of the heading;
extract, for the heading, feature words by reducing dimensions of the words appearing in the documents using principal component analysis (PCA);
generate a new heading based on the extracted feature words; and
generate a corrected structured document by replacing the heading with the new heading.

2. The information processing device according to claim 1, wherein the subordinate elements include at least one of subordinate headings below the heading and the text below the heading in the structured document.

3. The information processing device according to claim 1, wherein the one or more processors extract the feature words using a TF-IDF value.

4. The information processing device according to claim 1, wherein the one or more processors are further configured to convert the words appearing in the documents into vectors,
wherein the one or more processors reduce the dimensions of the words by reducing the dimension of the vectors using autoencoding, and
wherein the one or more processors extract the feature words by converting the vectors with the reduced dimensions into the feature words.

5. The information processing device according to claim 1, wherein the one or more processors are further configured to detect, as the heading, an inappropriate heading from a plurality of headings included in the structured document.

6. The information processing device according to claim 5, wherein the one or more processors generate the corrected structured document by replacing the inappropriate heading in the document with the new heading.

7. The information processing device according to claim 5, wherein the one or more processors generate the corrected structured document by adding at least a part of the new heading to the inappropriate heading in the document.

8. The information processing device according to claim 5, wherein the inappropriate heading is that of a character string identical to another heading in a parallel relationship in the structured document.

9. The information processing device according to claim 5, wherein the inappropriate heading is in a parallel relationship in the structured document and includes a number or a symbol without meaning or content.

10. The information processing device according to claim 1, wherein the one or more processors are further configured to convert an inputted document into the structured document.

11. An information processing method performed by a computer and comprising:

acquiring a structured document including a heading and text;
generating, for the heading included in the structured document, a matrix of frequency of occurrence of words appearing in documents of subordinate elements of the heading;
extracting, for the heading, feature words by reducing dimensions of the words appearing in the documents using principal component analysis (PCA);
generating a new heading based on the extracted feature words; and
generating a corrected document by replacing the heading with the new heading.

12. A non-transitory computer-readable recording medium storing a program executable by a computer to perform processing comprising:

acquiring a structured document including a heading and text;
generating, for the heading included in the structured document, a matrix of frequency of occurrence of words appearing in documents of subordinate elements of the heading;
extracting, for the heading, feature words by reducing dimensions of the words appearing in the documents using principal component analysis (PCA);
generating a new heading based on the extracted feature words; and
generating a corrected document by replacing the heading with the new heading.

* * * * *